United States Patent [19]
Lohaus

[11] Patent Number: 5,769,199
[45] Date of Patent: Jun. 23, 1998

[54] CLUTCH DISC WITH ACTUATION OF THE IDLE SPRINGS BY MEANS OF A CONTROL PLATE

[75] Inventor: Norbert Lohaus, Schweinfurt, Germany

[73] Assignee: Fichtel & Sachs AG, Schweinfurt, Germany

[21] Appl. No.: 680,938

[22] Filed: Jul. 16, 1996

[30] Foreign Application Priority Data

Jul. 17, 1995 [DE] Germany .......................... 195 26 050.3

[51] Int. Cl.[6] .............................. F16D 13/64; F16D 3/14
[52] U.S. Cl. .................................... 192/213.21; 192/70.17
[58] Field of Search .............................. 192/70.17, 213.2, 192/213.1, 213.11, 213.12, 213.21, 213.22

[56] References Cited

FOREIGN PATENT DOCUMENTS 4332936   4/1994   Germany.
2158193   11/1985   United Kingdom.

*Primary Examiner*—Charles A. Marmor
*Assistant Examiner*—Saúl Rodríquez
*Attorney, Agent, or Firm*—Nils H. Ljungman and Associates

[57] ABSTRACT

A clutch disc for a motor vehicle clutch, the clutch disc having an idle suspension system and a load suspension system. The idle springs of the idle suspension system are located in the hub disc and are actuated by means of a control plate. The control plate includes axially bent control tabs which engage the idle springs of the idle suspension system, whereby the width of the idle springs can be approximately equal to the thickness of the hub disc.

18 Claims, 5 Drawing Sheets

FIG. 2
FIG. 2a
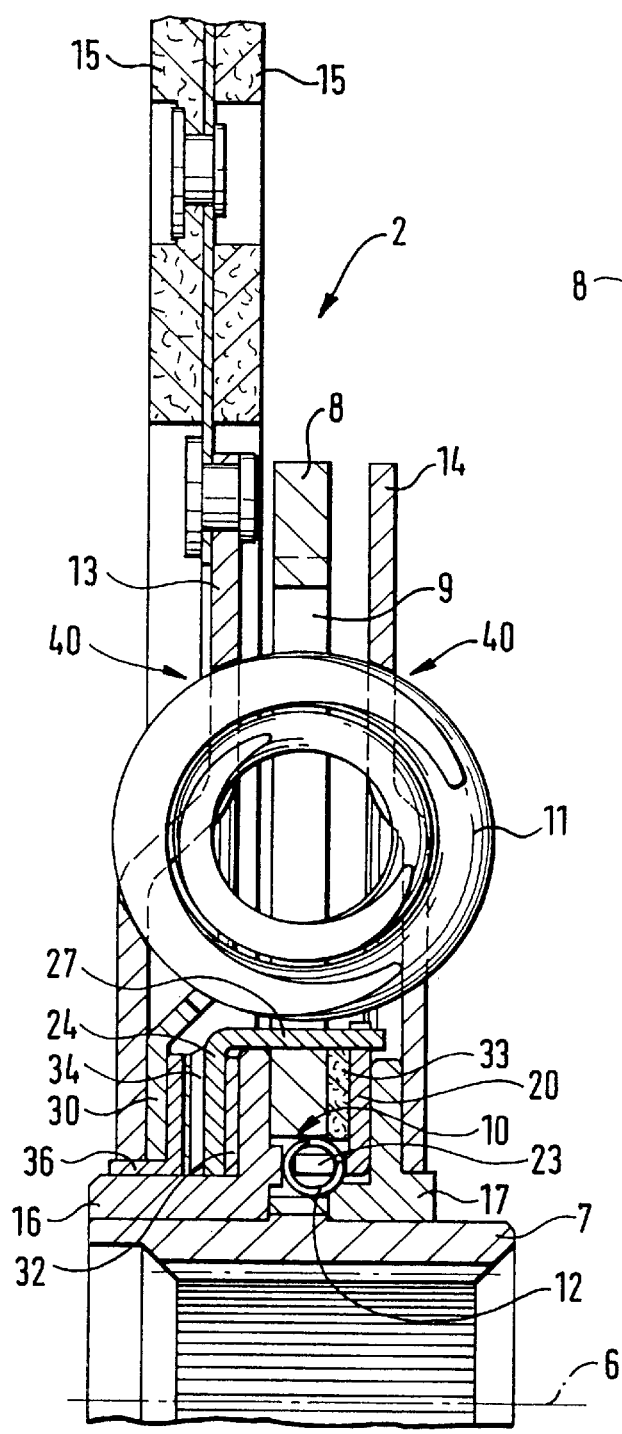
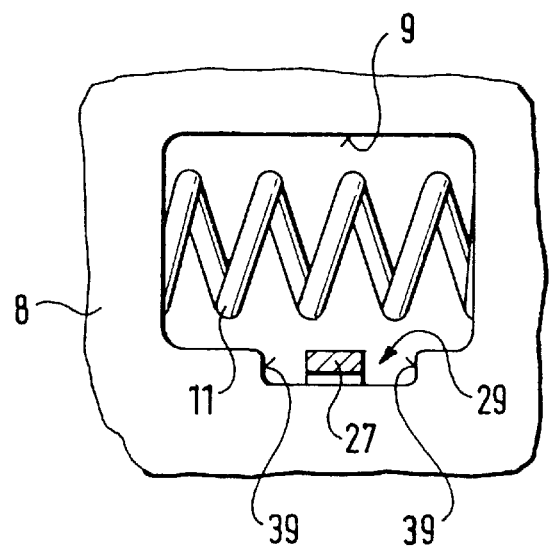

FIG. 5
FIG. 5a
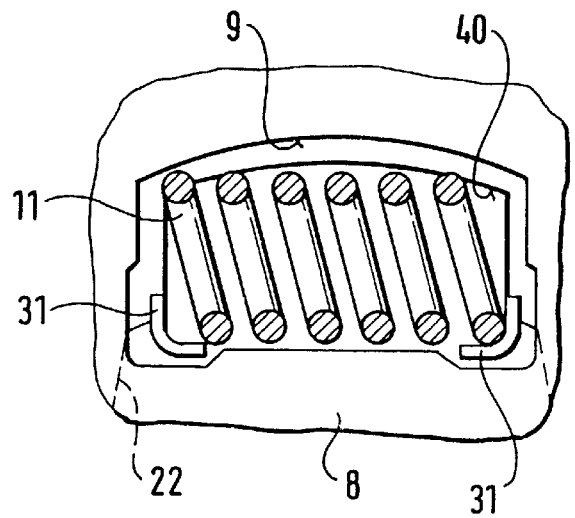
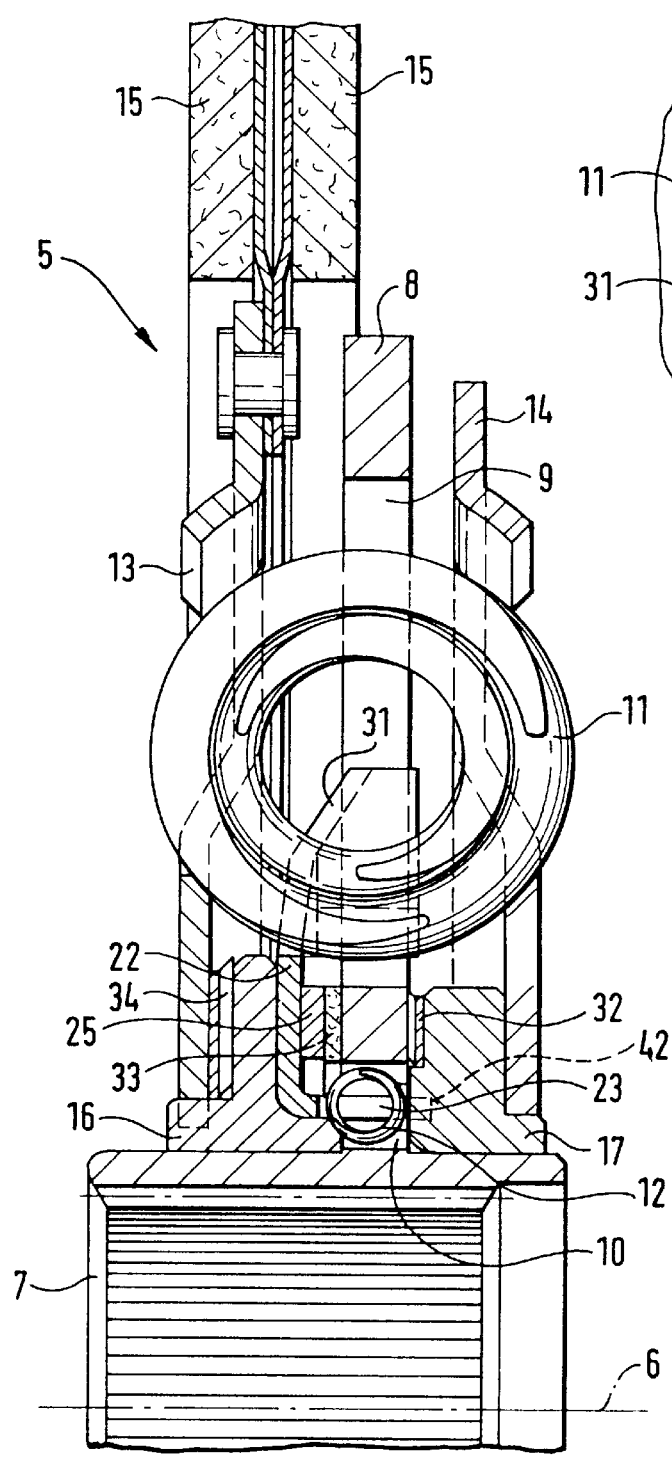

CLUTCH DISC WITH ACTUATION OF THE IDLE SPRINGS BY MEANS OF A CONTROL PLATE

BACKGROUND OF THE INVENTION

1. Field of the Invention

The present invention generally relates to a clutch disc as is typically used in a motor vehicle clutch. More specifically, the present invention generally relates to a friction clutch having a hub which is non-rotationally fastened on a transmission shaft, a hub disc which is non-rotationally connected to the hub, a load suspension system having springs located in apertures of the hub disc, an idle suspension system having springs located in apertures of the hub disc, and a control plate actively connected to a spring of the load suspension system, whereby the control plate actuates the springs of the idle suspension system.

2. Background Information

A similar clutch disc of known design is disclosed in European Patent Application 0 475 283, for example. In this known design, the springs of the idle spring device are actuated by control plates which on one hand interact with special springs of the load suspension system, and on the other hand extend alongside the hub disc in which the springs of the idle suspension system are located, where they apply pressure to the springs in the areas which extend axially out of the corresponding apertures in the hub disc.

OBJECT OF THE INVENTION

The object of the present invention is to minimize the space occupied by the idle spring device in clutch discs of the type described above.

SUMMARY OF THE INVENTION

The present invention teaches that this object can be accomplished by control tabs which extend axially from the control plate. As a result of the actuation of the idle springs by the control tabs which are bent axially out of the control plate, it is possible to realize idle springs which have a very small diameter, whereby the space required for the installation of the idle spring device is very small. The outside diameter of the idle springs can thereby be approximately equal to the thickness of the material of the hub disc. Furthermore, because the travel of the idle spring device in the circumferential, or peripheral, direction is limited by stops to the actual range of action, the apertures for the idle springs in the hub disc are also circumferentially relatively small, so that there are also essentially no problems in terms of strength even if a plurality of idle springs are used to connect the hub to the hub disc.

The present invention also teaches that there are two control plates which are identical and are installed symmetrically, with one control plate located on each side of the hub disc. The control tabs of the two control plates thereby face one another, and their end surfaces are in contact with one another so that the control plates are supported axially, to thereby form a cage between them which is essentially free of axial forces and in which an idle friction device is located. The use of two identical components has advantages in terms of manufacturing and the size of the inventory which must be maintained, and also eliminates problems of mix-ups during assembly.

The load friction device is thereby located between the control plates and the insides of the cover plates, and the travel of the control tabs in openings in the hub disc is limited circumferentially by stops. The control plates with their control tabs thereby perform a plurality of functions simultaneously. On one hand, they apply pressure to the idle springs in the idle range. They also limit the circumferential travel of the idle spring device, And, finally, they form a space which is free of axial forces, which makes it possible to use an idle friction device which can be adjusted or tuned independently of the load friction device.

The present invention also teaches that on one side of the hub disc there is a control plate, and on the other side there is a support plate, whereby the support plate is supported axially on the control plate by arms which are bent at right angles and is non-rotationally connected to the control plate, so that in this case, too, an independently adjustable idle friction device can be located in the space between the support plate and the control plate which is free of axial forces. The angular limitation of travel of the control plate and the support plate can thereby be achieved by extending the control plate radially outward and having it interact with a special spring of the load suspension system, whereby the travel of the control plate is angularly limited in the aperture of this load spring in the hub disc. However, the angular limitation can also be achieved by circumferentially restricting the axial arms of the support plate in the hub disc by means of corresponding stops.

If it is necessary to use an additional friction device inside the load suspension system, there can be an additional control plate which is located between the support plate and the cover plate corresponding to it, and which control plate also interacts with a spring of the load spring device.

The present invention also relates to an embodiment in which a control plate is provided between the hub disc and a cover plate, which cover plate interacts with a support plate. The support plate is located between the control plate and the hub disc and extends by means of arms through openings in the hub disc corresponding to the entire angle of rotation of the torsional vibration damper of the clutch disc, and is axially and circumferentially supported on a second cover plate. The support plate is thereby in direct contact with the control plate. In this construction, both the control plate and the support plate are located on one side of the hub disc, and axial space can thus be saved on the opposite side of the hub disc. The support plate is thereby active with respect to the hub disc over the entire angle of rotation, so that the idle friction device which interacts with the support plate should be considered the basic friction device which is active over the entire range of angular rotation.

The present invention also teaches that the control plate and the support plate are located on one side of the hub disc, whereby the support plate has corresponding arms which extend through openings in the hub disc corresponding to the active range of the idle spring device, by means of which it is axially supported on the inside of the cover plate. In this construction, a space which is essentially free of axial forces is formed, and in which the idle friction device can be located, which is active only in the range of action of the idle spring device. The support plate and the control plate are thereby located on one side of the hub disc, and thus leave axial space free on the opposite side of the hub disc.

In a further embodiment, the present invention teaches that the control plate is located on one side of the hub disc, and its control tabs extend through the space in which the idle springs are located and are supported axially and circumferentially on the other side of the hub disc on a bearing element, which bearing element is responsible for guiding the one cover plate with respect to the hub disc. In this construction, the bearing element is simultaneously used for the components which are guided on the hub, which means that one additional component can be saved.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments illustrated in the accompanying drawings in which:

FIG. 2 shows the upper half of a clutch disc with a detail;

FIG. 2a shows an enlarged detail of the apertures of the hub disc;

FIG. 5 shows the upper half of a clutch disc; and

FIG. 5a shows an enlarged detail of an additional embodiment of the clutch disc of FIG. 5.

DESCRIPTION OF THE PREFERRED EMBODIMENT

Figure 1:
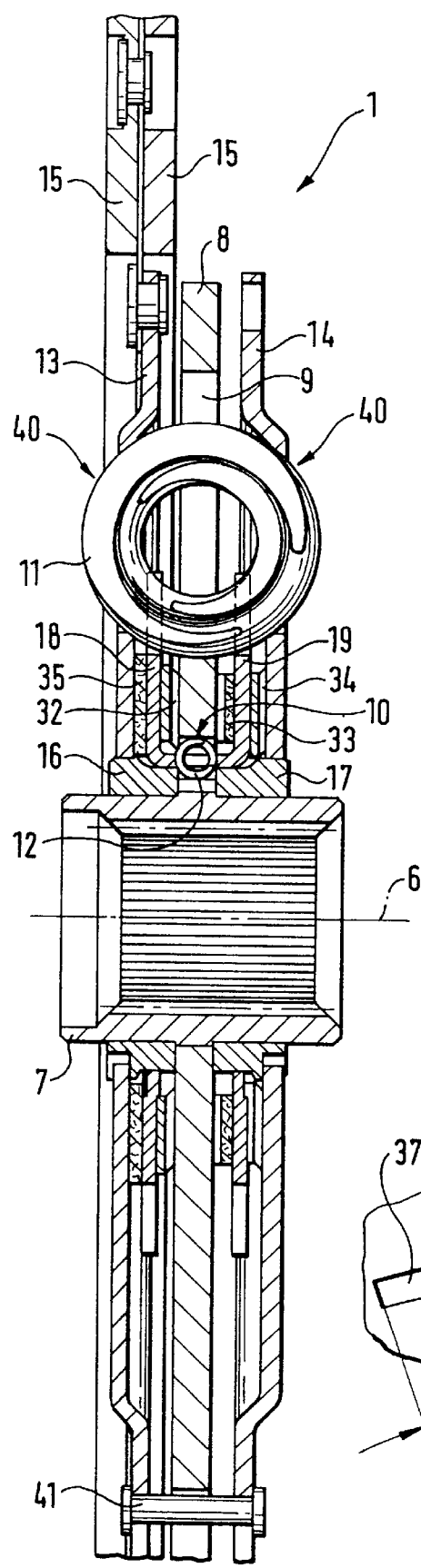
FIG. 1 is a longitudinal section through a clutch disc.

FIG. 1 shows a longitudinal section through a clutch plate 1 with a hub 7, which is oriented concentric to an axis of rotation 6 and which can be fastened non-rotationally on a transmission shaft (not shown). Non-detachably connected with the hub 7 is a hub disc 8 which extends approximately radially outward in the shape of a disc. On both sides of this hub disc 8 there are cover plates 13 and 14 respectively, which are non-rotationally connected to one another and are held at a distance from one another by means of rivets 41, and one of which cover plates 13 carries the friction linings 15 on the radial outside. In apertures 9 of the hub disc 8 and in corresponding apertures 40 of cover plates 13 and 14, there are a plurality of springs 11 distributed around the periphery for the load spring device. In the radial space between the apertures 9 and the hub 7, there are additional apertures 10 in the hub disc 8, which apertures contain springs 12 for an idle spring device. The springs 12 thereby have an outside diameter or width which is approximately equal to the thickness of the material of the hub disc 8.

In other words, in the radial space between the slots or first apertures 9 and the hub 7, there are additional second apertures 10 in the hub disc 8, which contain springs 12 for an idle suspension system. The springs 12 thereby have an outside diameter or width which is substantially similar to the thickness of the material of the hub disc 8.

The two cover plates 13 and 14 can be provided in their radially inner terminal area with bearing elements 16 and 17 which provide guidance with respect to the hub 7. In this embodiment, the bearing elements 16 and 17 can be non-rotationally connected to the corresponding cover plates 13, 14 respectively. Between the hub disc 8 and each of the cover plates 13 and 14 there are control plates 18 and 19 respectively, whereby the two parts are shown separately in enlarged details in FIG. 1a. The control plates 18 and 19 can preferably be identical to one another and are installed symmetrically. In their radially outer area, control plates 18 and 19 extend into the vicinity of the springs 11 for the load suspension system, and can be actively connected to a special spring 11. This connection is explained in greater detail in the above-referenced known design, and is illustrated by way of example in FIG. 5a. This special spring 11 of the load spring device is thereby located in an aperture 9 of the hub disc 8, which aperture 9 is peripherally or circumferentially larger than the spring 11 when the spring is in its rest position. The corresponding apertures 40 in the cover plates 13 and 14 are realized so that they correspond to the peripheral or circumferential dimension of the spring 11 in its rest position.

The control plates 18 and 19, as shown in FIG. 1, can be provided in their radially inner terminal area with control tabs 23 which extend essentially axially, and which, when the clutch 1 is in the idle position, are in contact against the end surfaces of the spring 12 for the idle spring device. The control tabs 23 of the two control plates 18 and 19 can be simultaneously in contact with one another by means of their end surfaces.

The apertures 10 in the hub disc 8 are provided on the periphery with openings 37 (see FIG. 1b) for the insertion of the control tabs 23, in which openings 37 the control tabs 23 which are not currently involved in the pressurization of the springs 10 can move until contact with a corresponding stop 38, which thereby limits the range of action of the idle spring device. The openings 37 are realized in both directions of rotation, but if they have different dimensions, they can make possible different angular ranges labeled as the Greek letters "alpha" ($\alpha$) and "beta" ($\beta$) in FIG. 1b.

In other words, the openings 37 can include slots circumferentially extending from each of the two circumferential ends of each of the apertures 10. Each of the two openings or circumferential slots 37 that can extend from an aperture 10 can independently define an angular extent of rotation, or travel of the idle suspension system, about the rotational axis 6 for a given direction of rotation. One opening or slot 37 can limit idle suspension system travel to the angular range labeled as the Greek letter "alpha" ($\alpha$) in FIG. 1b in a first direction of rotation about the rotational axis 6. The opposite opening or slot 37 can limit idle suspension system travel to the angular range labeled as the Greek letter "beta" ($\beta$) in FIG. 1b in a second direction of rotation about the rotational axis 6.

Between the cover plates 13 and 14 and the two control plates 18 and 19 there can be elements of a load friction device, which include a friction spring 34 and a friction ring 35 on the opposite side. As a result of the force of the friction spring 34 and the non-detachable connection between the two cover plates 13 and 14, an axial force is applied to the two control plates 18 and 19 and the control tabs 23 can act as axial stops (see FIG. 1a). A space is therefore left between the two control plates 18 and 19 which is essentially free of axial forces, in which space the components of an idle friction device are located, which idle friction device consists of a friction spring 32 and a friction ring 33. The bias force of the friction spring 32 is thereby significantly less than the bias force of the friction spring 34, so that the mutual support of the two control plates IS and 19 is stable.

In other words, an idle friction device can be provided, which preferably and in accordance with one embodiment, includes a friction spring 32 and a friction ring 33. The idle friction device can generate an axial force by means of friction spring 32, thereby creating a normal force acting on the friction ring 33. This normal force can then be transmitted by the friction ring 33 to a contacting component (as for example, the hub disc 8). With relative circumferential motion between the friction ring 33 and the contacting component caused by idle suspension system travel, the normal force being applied to the contacting component can generate a frictional force to dissipate energy.

For optimal performance of the idle friction device, it is preferable to isolate the idle friction device from exposure to other axial forces (such as axial forces from a load friction device) generated during operation of the clutch disc. By isolating the idle friction device, it is possible to better control the frictional force generated by the idle friction device and to tune or adjust the idle friction device independently of a load friction device.

Figure 1A:
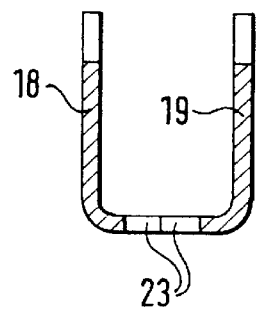
FIG. 1a shows an enlarged detail of the control plates of FIG. 1.
Figure 1B:
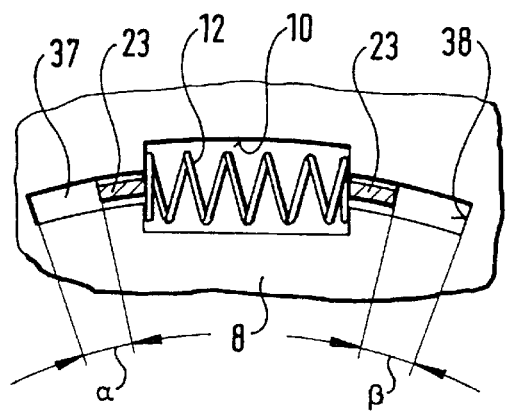
FIG. 1b shows an enlarged detail of the apertures of the hub disc of FIG. 1.

As illustrated in FIGS. 1, 1a and 1b, the two control plates 18 and 19 can be used to isolate the idle friction device, External axial loads acting against control plate 18 can be transmitted to the other control plate 19, and vice versa. The idle friction device therefore is not exposed to the external axial loads acting against the control plates 18 and 19, and is thereby effectively isolated from such axial loads and forces.

The functioning of the clutch disc illustrated in FIG. 1 is described below:

Assuming that the hub 7 is stationary, and when torque is applied to the friction linings 15, in a low torque range, the load spring device 8, 11, 13, 14 can be considered a non-rotational assembly, whereby at least one of the springs 11 peripherally fills up the corresponding apertures in the cover plates 13 and 14 and in the hub disc 8, while at least one spring 11, which interacts with the control plates 18, 19, as illustrated in FIG. 5a, interacts with a larger aperture 9 in the hub disc 8, which is specifically larger than the angular range of travel of the idle spring device. In this idle range, the control plates 18 and 19 are coupled in their radially outer areas with the spring 11 and torque is applied to them by the spring 11 against the force of the springs 12 of the idle spring device and against the force of the idle friction device, originating from the spring 32 and the friction ring 33.

The control tabs 23 thereby transmit the torque from the friction linings 15, the cover plates 13 and 14, and the spring 11 to the control plates 18, 19 and to the springs 12, which are in turn supported on corresponding edges of the apertures 10 in the hub disc 8. The load friction device which is located between the two control plates 18 and 19 and the two cover plates 13 and 14 in the form of a friction spring 34 and a friction ring 35, cannot function during this phase, since all the components are executing the identical angular movement. After the control tabs 23 come into contact against the stops 38 of the openings 37 in the hub disc 8 and after the spring 11 comes to a stop in the aperture 9, the pressurization of the spring 12 is ended, and the control plates 18 and 19 can henceforth be considered non-rotationally connected to the hub 7 or to the hub disc 8. Thus the action of the idle friction device with the components 32 and 33 also ends.

As additional torque is applied, the two cover plates 13 and 14 then move against the force of the spring 11 further in the peripheral direction with respect to the hub disc 8 and the hub 7, and the friction force of the load friction device must then be overcome. This load friction device is represented by the friction spring 34 and the friction ring 35 which are located between the moving cover plates 13 and 14 and the stationary control plates 18 and 19.

The travel of the two control plates 18 and 19 can, however, also be limited without the openings 37 and the stops 38. For example, as illustrated in FIGS. 5 and 5a (for one control plate 22), the control plates 18 and 19 could have stop tabs 31 (not shown in FIG. 1) in their radially outer area which project axially or are axially bent and extend into the apertures 9 of the hub disc 8. The springs 12 of the idle spring device are guided in the radial direction by means of the apertures 10 in the hub disc 8, and guidance in the axial direction can be provided by the two control plates 18 and 19, but it is also possible for the bearing elements 16 and 17—which are preferably made of plastic—to provide guidance for the springs 12 in the axial direction.

FIG. 2 is a section through the upper half of a clutch disc 2, which is similar to the schematic diagram of the clutch disc 1 in FIG. 1. For example, the hub 7 is located with the non-rotational hub disc 8 concentric to an axis of rotation 6, and on both sides of the hub disc 8 there are cover plates 13 and 14 which are non-rotational and are held at a distance from one another, and one of which is provided with friction linings 15. In apertures 9 of the hub disc 8 and in corresponding apertures in the cover plates 13 and 14, there are springs 11 for the load suspension system, and the cover plates 13 and 14 are guided in their radially inward area by means of bearing elements 16 and 17 respectively on the outside circumference of the hub 7.

The idle suspension system includes springs 12 in apertures 10 in the hub disc 8, which apertures 10 are radially inside the apertures 9, and these springs 12 are actuated by a control plate 20 which is located radially inside the springs 11 and between the hub disc 8 and the cover plate 14. The schematic construction of the control plate 20 is similar to one of the control plates 18 and 19 illustrated in FIGS. 1 and 1a, with radially inward control tabs 23 bent in the axial direction, which tabs actuate the springs 12. The control plate 20 is extended radially outward in a manner not shown, and interacts with one of the springs 11, by means of which it is actuated.

In its idle position, this spring 11 is inserted without peripheral clearance into the apertures 40 of the cover plates 13 and 14, while the aperture 9 in the hub disc 8 is peripherally larger, namely corresponding to the range of action of the idle suspension system. The control plate 20 interacts with a support plate 24 which is located between the hub disc 8 and the cover plate 13. The support plate 24 is provided with axially-bent arms 27 which extend through corresponding slots or openings 29 (see FIG. 2a) in the hub disc 8, and the support plate 24 is non-rotationally connected to the control plate 20, and is also axially supported on the control plate 20. The openings 29 in the hub disc 8 are provided on the periphery with stops 39, as shown in FIG. 2a, which allow freedom of movement in the peripheral, or circumferential, direction for the arms 27, which movement corresponds to the range of action of the idle suspension system. The movement of the control plate 20 is thereby limited so that it corresponds to the range of action of the idle suspension system.

This travel limitation can also be realized in a different manner, and preferably as illustrated in FIG. 5a, by means of stop tabs 31 which are located on the control plate 22 and extend into the aperture 9 of the hub disc 8. As a result of the axial support between the control plate 22 and the support plate 24, a space which is essentially free of axial forces is formed, in which the friction device for idle operation is located, and which includes a friction ring 33 between the control plate 22 and the hub disc 8, and of a friction spring 32 between the support plate 24 and the hub disc 8.

In other words, in this embodiment shown in FIG. 2, with the axial support between the control plate 20 and the support plate 24, the idle friction device, including friction ring 33, is effectively isolated from external loads as previously discussed.

In this embodiment, there is also a leg of the bearing element 16 which extends radially between the friction spring 32 and the hub disc 8. Preferably, the bearing element 16 can also be provided as an axial guide for the springs 12, and extends by means of extensions into the aperture 10, which creates a non-rotational connection between the bearing element 16 and the hub disc 8.

The friction device for the load range is installed in the axial space between the control plate 20 and the support plate 24 and the cover plates 13 and 14. This friction device includes a radial flange of the bearing element 17 and a friction spring 34 between the support plate 24 and the cover plate 13. In this case, between the friction spring 34 and the cover plate 13 there is also a separate thrust collar 36 and an additional control plate 30, which also interacts with one of the springs 11 and creates an additional friction stage in the load range.

The functioning of the clutch disc illustrated in FIG. 2 is described below:

In the rest position, all the springs 11 of the load suspension system are inserted without peripheral clearance into the corresponding apertures 40 in the cover plates 13 and 14, and all the apertures 9 in the hub disc 8 are larger in the peripheral direction at least by the magnitude of the travel of the idle suspension system, When torque is applied to the friction linings 15 and the hub 7 is held stationary, the control plate 20 is moved by one of the springs 11 together with the cover plates 13 and 14 peripherally with respect to the hub 7, and the springs 12 are compressed.

Simultaneously with this idle suspension system, the idle friction device, which includes the control plate 20, the support plate 24 non-rotationally connected to the control plate 20, the friction spring 32 and the friction ring 33, functions, The parts 20 and 24 are moved with the spring 11 with respect to the hub disc 8 and the hub 7. The idle suspension system and the idle friction device are limited in terms of angular travel by the arresting of the control plate 20 with respect to the hub disc 8, namely either by the arms 27 of the support plate 24 which come into contact with the stops 39, or by means of a device like the one shown in FIG. 5a.

In the event of a larger angular excursion beyond the idle range—preferably in stages—all the springs 11 are compressed, and simultaneously the friction device for the load range functions. This friction device consists of the friction spring 34 and the bearing element 17, whereby the control plate 20 and the support plate 24 with the hub 7 should be considered a non-rotational unit, relative to which the two cover plates 13 and 14 move. There is also an additional control plate 30 which represents an additional friction stage inside the travel of the load spring and is also pressurized by the friction spring 34 and functions between the separate thrust collar 36 and the cover plate 13.

Figure 3:
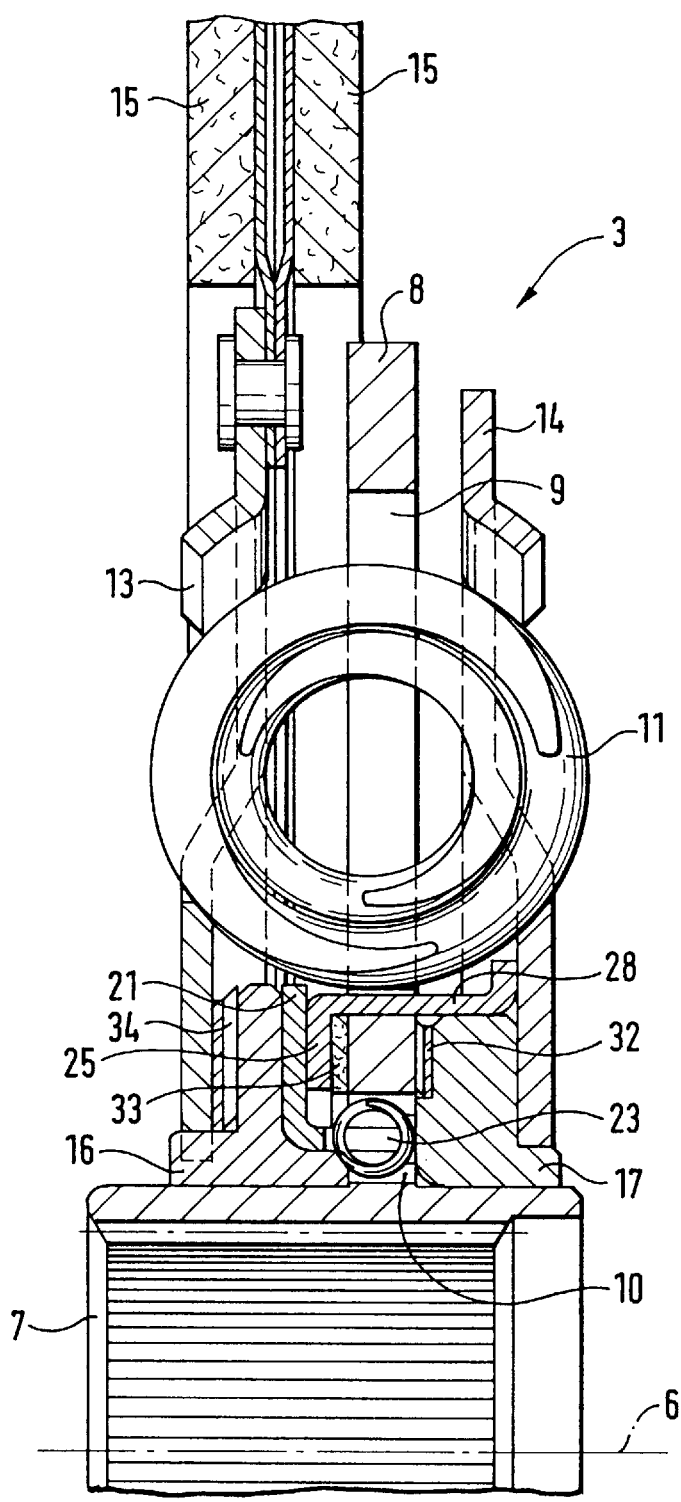
FIG. 3 shows the upper half of an additional embodiment of a clutch disc.

FIG. 3 shows a clutch disc 3 in which the idle springs 12 are actuated by actuator plate 21 which is located laterally between the hub disc 8 and the cover plate 13. Between the control plate 21 and the radially inner area of the cover plate 13, there is also a bearing element 16, as well as a friction spring 34 for the load friction. The bearing element 16 is non-rotationally connected to the cover plate 13. In the axial direction, the two parts are held so that they can be displaced in relation to one another. Between the hub disc 8 and the other cover plate 14 there is also a bearing element 17, whereby the two bearing elements 16 and 17 provide the guidance for the two cover plates 13 and 14 with respect to the hub 7. Between the control plate 21 and the opposite cover plate 14 there is a support plate 25 which extends by means of axially-bent arms 28 through openings in the hub disc 8, and is axially supported on the inside of the cover plate 14.

The openings in the hub disc 8 are extended far enough so that the support plate 25 can travel a peripheral distance which corresponds to the range of action of the idle suspension system. Between the support plate 25 and the hub disc 8 there is a friction ring 33 for the idle friction device, and the corresponding friction spring 32 is located between the bearing element 17 and the hub disc 8. The load friction device is located between the control plate 21 and the cover plate 13 in the form of the friction spring 34 and the bearing element 16. The idle springs 12 in the apertures 10 of the hub disc 8 are actuated by means of the control tabs 23 of the control plate 21. The control plate 21 is thereby connected to one of the springs 11 of the load suspension system, which is free to move peripherally in the apertures 9 of the hub disc 8 by the range of action of the idle suspension system.

As shown in FIG. 3, axial loads applied against the control plate 21 can be transmitted to the cover plate 14 by means of support plate 25. As previously discussed, this results in the isolation from external axial loads of the idle friction device, which can include friction ring 33 and friction spring 32 and can be located between the cover plate 14 and the control plate 21.

The functioning of the clutch disc illustrated in FIG. 3 is described below:

When torque is applied by means of the friction linings 15 and by means of the two cover plates 13 and 14, the two cover plates 13 and 14 move with respect to the hub disc 8 and the hub 7, initially without pressurizing the springs 11. The springs 12 are pressurized only when one of the springs 11 transmits its movement to the control plate 21—as described above in connection with FIGS. 1 and 2. Simultaneously, the support plate 25 also moves with the support plate 21, because it is driven by frictional force on account of the application of force by the friction spring 34, the control plate 21 and the cover plate 14.

When the maximum possible pre-damping angle is reached, the control plate 21, (as shown in FIG. 5a with corresponding control plate 22), can come into contact peripherally with the limit of aperture 9 in the hub disc 8 and is thereby fixed in position with respect to the hub disc 8. As the cover plates 13 and 14 continue to move with respect to the hub 7, the idle friction device, which is located in the axial span of the support plate 25 which is essentially free of axial forces and consists of the friction ring 33 and the friction spring 32, is held stationary, and from that point on acts on the load friction device together with the load springs 11. The load friction device thereby includes the friction spring 34, which is supported on the cover plate 13 and on the bearing element 16 and generates a friction force between the stationary control plate 21 and the bearing element 16.

Figure 4:
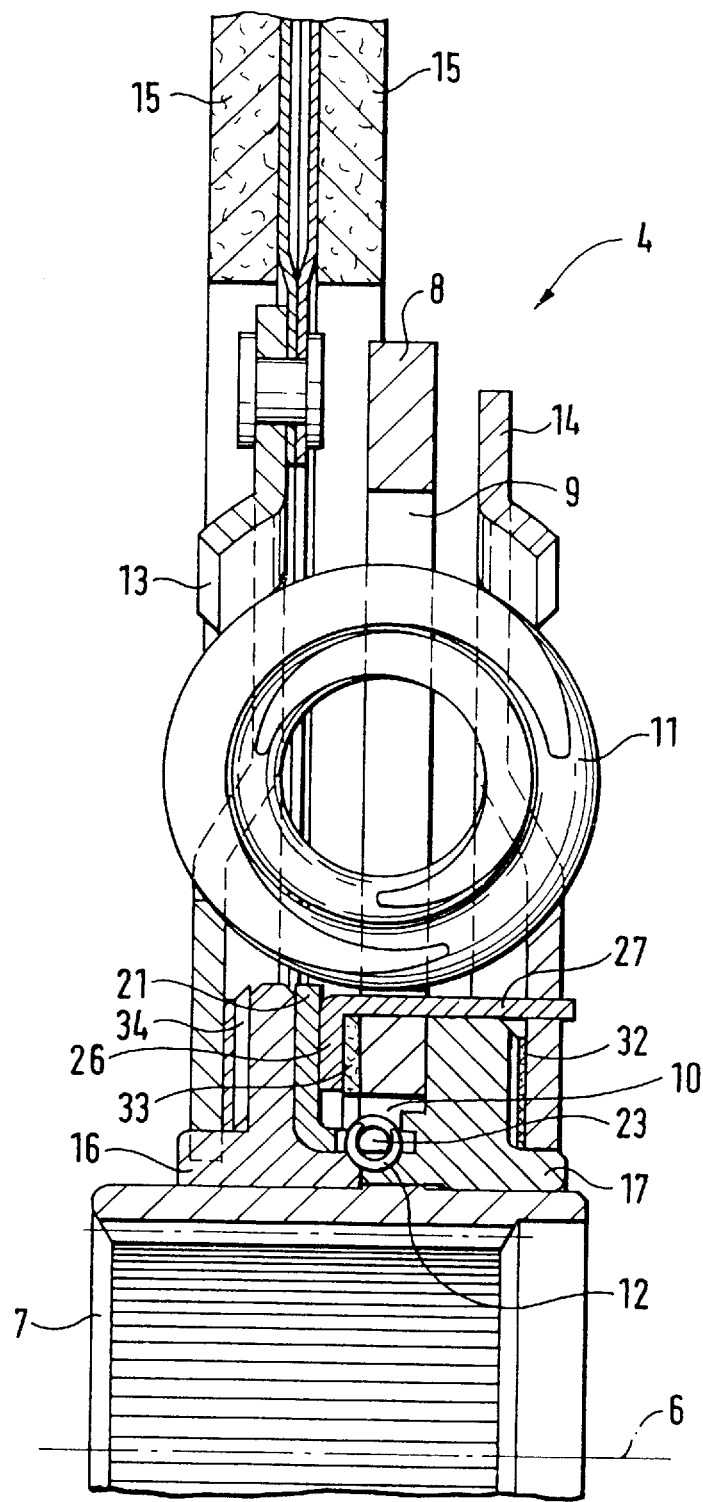
FIG. 4 shows the upper half of a modified embodiment of a clutch disc.

As illustrated in FIG. 4, the clutch disc 4 differs from the clutch disc 3 shown in FIG. 3 in that the support plate 26 is not only axially supported on the cover plate 14, but is also non-rotationally connected to it. For this purpose, the arms 27 extend without clearance in the peripheral direction through corresponding openings in the cover plate 14. The bearing element 17 is also non-rotationally connected to the hub disc 8, because it is engaged without clearance peripherally in the apertures 10 for the idle springs 12.

As a result of this arrangement of the support plate 26, the support plate 26 moves over essentially the entire angle of rotation of the clutch disc 4 together with the cover plate 14, whereby the idle friction device including the friction ring 33 and the friction spring 32 is realized in the form of a basic friction device, and functions not only in the idle range, but also over the entire range of angular rotation. The load friction device, which includes the friction spring 34 and the bearing element 16, is actuated in addition to the basic friction device after the control plate 21 comes to a stop in the aperture 9 of the hub disc 8.

The clutch disc 5 illustrated in FIG. 5 has a construction in which the control plate 22 also assumes the function of the support plates in FIGS. 1 to 4. As in the other embodiments, the two cover plates 13 and 14 are non-detachably connected to one another and are held at a distance from one another, and one of them is provided with the friction linings 15. The cover plates 13 and 14 are located on both sides of a hub disc 8 which is non-detachably connected to a hub 7. All the parts are oriented so that they are concentric to an axis of rotation 6.

A plurality of springs 11 for the load suspension system are located on the periphery in apertures 40 of the cover plates 13 and 14, and in the hub disc 8 there are also apertures 9 which are larger peripherally by at least the range of action of the idle suspension system. The two cover plates 13 and 14 are guided toward the hub 7 by means of bearing elements 16 and 17. The control plate 22 is provided with axially-bent control tabs 23 which actuate the springs 12 for the idle suspension system. The springs 12 are located in apertures 10 of the hub disc 8.

The actuation of the idle suspension system is illustrated schematically as in FIG. 1b (for a corresponding control plate 18 or 19). The control tabs 23, however, extend beyond the hub disc 8, and are axially and peripherally fixed by means of their ends 42 in corresponding openings of the bearing element 17. The bearing element 17 is preferably located on the opposite side of the hub disc 8 from the control plate 22, The bearing element 17 is thereby at some axial distance from the hub disc 8. The bearing element 16 is non-rotationally connected to the cover plate 13, but can move axially in relation to it, and the friction spring 34 for the load friction device is located between the two parts. As a result of the axial support of the control plate 22 on the bearing element 17, a space is formed between these two parts which is free of axial forces, in which space the friction device for the idle range is installed. This friction device consists of a friction ring 33 between the control plate 22 and the hub disc 8, and of a friction spring 32 between the hub disc 8 and the bearing element 17.

Additionally, as shown in FIG. 5, axial loads applied against the control plate 22 can be transmitted to the bearing element 17 and then to the cover plate 14. As previously discussed, this results in the isolation from external axial loads of the idle friction device, which can consist of friction ring 33 and friction spring 32 and can be located between the control plate 22 and the bearing element 17.

The control plate 22, in its radially outer area, has stop tabs 31 (see FIG. 5a) which on one hand interact peripherally with a spring 11 of the load spring device, and on the other hand are engaged in the aperture 9 of the load spring 11 in the hub disc 8. When the clutch disc 5 is in the idle position, the spring 11, with which the control plate 22 interacts, is inserted without clearance in the apertures 40 in the cover plates 13 and 14, and the aperture 9 in the hub disc 8 is peripherally larger by the range of action of the idle spring device. The stop tabs 31 have a peripheral dimension which corresponds to that of the spring 11 in its rest position. The aperture 9 in the hub disc 8 is realized peripherally so that the stop tabs 31 have a freedom of movement with respect to this aperture 9 which corresponds to the range of action of the idle spring device.

The functioning of this clutch disc 5 is described below:

When torque is applied by means of the friction linings 15 and the hub 7 is held stationary, all the springs 11 are moved without the application of force with respect to the hub disc 8. Only the springs 12 of the idle spring device are compressed by the control plate 22, since the control plate is driven in the peripheral direction by the corresponding spring 11. During this movement, the friction device for the load range is active and naturally by the movement of all the components 13, 16, 34, 22, 33, 17, 14 in the same direction with respect to the hub disc 8. After coming into contact with the stop tabs 31 on the aperture 9 in the hub disc 8, the idle friction device and the idle suspension system come to a stop, and the continued movement of the cover plates 13 and 14 together with the bearing element 16 and the friction spring 34 produces the load friction force between the bearing element 16 and the control plate 22. Simultaneously, torque is applied to the springs 11 of the load device either all at once or one after another.

One feature of the invention resides broadly in the clutch disc for a friction clutch, comprising a hub which is non-rotationally fastened on a transmission shaft, a hub disc which is non-rotationally connected to the hub, first apertures in the hub disc for springs of a load suspension system, cover plates on both sides of the hub disc which are non-detachably connected to one another and are held at a distance from one another, and which also have apertures for springs of the load suspension system, friction linings in the vicinity of the outside diameter of one of the cover plates, bearing elements which are located between the radially inner areas of the cover plates and essentially cylindrical areas of the hub for mutual guidance, second apertures in the hub disc for springs of an idle suspension system radially inside the apertures for the load suspension system, at least one control plate between the hub disc and one of the cover plates, which control plate is actively connected to a spring of the load suspension system, which spring is inserted in an aperture of the hub disc, which window is peripherally larger than the spring in its rest position by the range of action of the idle suspension system, whereby the control plate is rotationally limited with respect to the hub disc by means of stops and actuates the springs of the idle suspension system, characterized by the fact that the springs 12 of the idle suspension system 8, 12, 18, 19, 20, 21 and 22 have an outside diameter which is approximately equal to the thickness of the hub disc 8, and also characterized by the fact that the axially-bent control tabs 23 of the control plates 18, 22 at the level of the springs 12 of the idle suspension system activate the springs 12 and thereby activate the idle suspension system.

Another feature of the invention resides broadly in the clutch disc characterized by the fact that there are two control plates 18, 19, which are identical and are installed symmetrically, one on each side of the hub disc 8, whereby the control tabs 23 of the two control plates 18, 19 are axially supported on one another by means of their ends, and thereby form a cage which is free of axial forces in which an idle friction device 32, 33 is located.

Yet another feature of the invention resides broadly in the clutch disc characterized by the fact that the load friction device 34, 35 is located between the control plates 18, 19 and the insides of the cover plates 13, 14, and the movement of the control tabs 23 in openings 37 in the hub disc 8 is limited by stops 38.

Still another feature of the invention resides broadly in the clutch disc characterized by the fact that there is a control plate 20 which is located between the hub disc 8 and the one cover plate 14, and a support plate 24 which is located between the hub disc 8 and the other cover plate 13, and both are supported by means of arms 27 of the support plate 24, which arms extend through corresponding openings in the hub disc 8 radially between the load springs 11 and the idle springs 12, and thereby form a space which is free of axial forces in which the idle friction device 32, 33 is located.

A further feature of the invention resides broadly in the clutch disc characterized by the fact that the control plate 20 and the support plate 24 are non-rotationally connected in the vicinity of their axial support 27.

Another feature of the invention resides broadly in the clutch disc characterized by the fact that the openings 29 in the hub disc 9 serve as a peripheral stop for the arms 27 and thus limit the range of action of the idle suspension system 8; 12; 18, 19.

Yet another feature of the invention resides broadly in the clutch disc characterized by the fact that between the support plate 24 and the corresponding cover plate 13, there is an additional control plate 30 which creates an additional load friction stage 13, 30, 36, 34 in the range of action of the load suspension system 8, 11, 13, 14.

Still another feature of the invention resides broadly in the clutch disc characterized by the fact that there is a control plate 21 which is located between the hub disc 8 and the one cover plate 13, a support plate 26 between the control plate 21 and the hub disc 8, which support plate 26 is supported directly on the control plate 21 and by means of arms 27 penetrates openings corresponding to the entire angle of rotation, and the arms 27 are axially supported and non-rotationally attached on the other cover plate 14 to form a space which is free of axial forces and in which an idle friction device 32, 33 is located.

A further feature of the invention resides broadly in the clutch disc characterized by the fact that there is a control plate 21 between the hub disc 8 and the one cover plate 13, as well as a support plate 25 between the control plate 21 and the hub disc 8, which support plate 25 has arms 28 which extend through openings in the hub disc 8 corresponding to the range of action of the idle spring device 8, 12, 21 and is axially supported on the inside of the other cover plate 14 to form a space which is free of axial forces between the control plate 21 and the other cover plate 14 and in which the idle friction device 32, 33 is located.

Another feature of the invention resides broadly in the clutch disc whereby there is a control plate 22 between the one cover plate 13 and the hub disc 8, as well as a bearing element 17 between the other cover plate 14 and the hub 7, characterized by the fact that the control tabs 23 of the control plate 22 extend through the space of the idle springs 12, are axially and peripherally supported on the side of the hub disc 8 farther from the control plate 22 on the bearing element 17, and thereby create a space which is free of axial forces between the control plate 22 and the bearing element 17 in which space the idle friction device 32, 33 is located.

Examples of clutch discs which could possibly be adapted for use in the present invention, along with additional components generally associated with friction clutches which might be interchangeable with, or adaptable as, components of the embodiments as described hereinabove, might be disclosed by the following U.S. Patents, all of which are assigned to Fichtel & Sachs AG, the assignee for the present invention: U.S. Pat. No. 5,209,344; U.S. Pat. No. 5,213,188; U.S. Pat. No. 5,238,096; U.S. Pat. No. 5,249,660; and U.S. Pat. No. 5,251,736.

Other examples of clutch discs which could possibly be adapted for use in the present invention, along with additional components generally associated with friction clutches which might be interchangeable with, or adaptable as, components of the embodiments as described hereinabove, might be disclosed by the following U.S. Patents: U.S. Pat. No. 5,180,335; U.S. Pat. No. 5,217,409; U.S. Pat. No. 5,246,398; U.S. Pat. No. 5,401,213; and U.S. Pat. No. 5,450,935.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein, All of the patents, patent applications and publications recited herein, are hereby incorporated by reference as if set forth in their entirety herein.

The corresponding foreign patent publication applications, namely, Federal Republic of Germany Patent Application No. 195 26 050.3, filed on Aug. 17, 1995, having inventor Norbert Lohaus, and DE-OS 195 26 050.3 and DE-PS 195 26 050.3, are hereby incorporated by reference as if set forth in their entirety herein.

Although only a few exemplary embodiments of this invention have been described in detail above, those skilled in the art will readily apppreciate that many modifications are possible in the exemlary embodiments without materially departing from the novel teachings and advantages of the invention. Accordingly, all such modifications are intended to be included within the scope of this invention as defined in the following claims. In the claims, means-plus-function clauses are intended to cover the structures described herein as performing the recited function, and not only structural equivalents, but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A clutch disc for a friction clutch, such as a motor vehicle friction clutch, said clutch disc comprising:

a hub disc;

said hub disc being oriented concentrically about a rotational axis;

said hub disc having a thickness;
said hub disc thickness being defined generally parallel with the rotational axis;
an idle suspension system;
said idle suspension system comprising:
 at least one spring;
 said at least one spring having a width;
 at least one aperture disposed in said hub disc;
 said at least one aperture comprising means for locating said at least one spring; and
 said width of said at least one spring being similar to said thickness of said hub disc;
a first control plate;
said first control plate being oriented concentrically about the rotational axis;
said first control plate comprising a portion extending generally radially about the rotational axis;
the rotational axis defining an axial direction;
the axial direction being generally parallel with the rotational axis;
said first control plate comprising at least one control tab;
said at least one control tab substantially projecting in the axial direction from said radially extending portion of said first control plate;
said idle suspension system comprising said first control plate; and
said at least one control tab being disposed to operatively contact said at least one spring to activate said idle suspension system.

2. The clutch disc according to claim 1, further comprising:
 said at least one control tab of said first control plate comprising an end surface;
 said end surface of said at least one control tab of said first control plate being disposed at an opposite end of said at least one control tab from said radially extending portion of said first control plate;
 said clutch disc further comprising a second control plate;
 said second control plate being oriented concentrically about the rotational axis;
 said second control plate comprising a portion extending generally radially about the rotational axis;
 said second control plate comprising at least one control tab;
 said at least one control tab of said second control plate projecting substantially in the axial direction from said radially extending portion of said second control plate;
 said at least one control tab of said second control plate comprising an end surface;
 said end surface of said at least one control tab of said second control plate being disposed at an opposite end of said at least one control tab from said radially extending portion of said second control plate;
 said hub disc being disposed between said first control plate and said second control plate;
 said end surface of said at least one control tab of said first control plate being a first end surface;
 said end surface of said at least one control tab of said second control plate being a second end surface;
 said first end surface being disposed to contact said second end surface;
 an idle friction device;
 said idle friction device being disposed between said radially extending portion of said first control plate and said radially extending portion of said second control plate;
 means for substantially isolating the axial loading of said idle friction device; and
 said means for substantially isolating said idle friction device comprising said first control plate and said second control plate.

3. The clutch disc according to claim 2, wherein said first control plate is substantially similar to said second control plate.

4. The clutch disc according to claim 2, further comprising:
 a first cover plate;
 said first cover plate being oriented concentrically about the rotational axis;
 a second cover plate;
 said second cover plate being oriented concentrically about the rotational axis;
 said radially extending portion of said first control plate being disposed between said first cover plate and said hub disc;
 said radially extending portion of said second control plate being disposed between said second cover plate and said hub disc;
 a load friction device;
 said load friction device being disposed between at least one of following a) and b):
  a) said first cover plate and said first control plate; and
  b) said second cover plate and said second control plate;
 said at least one control tab of said first control plate comprising two control tabs;
 said two control tabs of said first control plate comprising a first control tab and a second control tab;
 said at least one control tab of said second control plate comprising two control tabs;
 said two control tabs of said second control plate comprising a first control tab and a second control tab;
 said end surface of said first control tab of said first control plate being disposed to contact said end surface of said first control tab of said second control plate;
 said end surface of said second control tab of said first control plate being disposed to contact said end surface of said second control tab of said second control plate;
 said at least one aperture of said hub disc further comprising a first end and a second end;
 said first end of said at least one aperture of said hub disc being disposed circumferentially opposite said second end of said at least one aperture of said hub disc;
 said at least one aperture of said hub disc further comprising a first circumferential slot;
 said first circumferential slot being oriented generally in a circumferential direction about the rotational axis;
 said first circumferential slot being disposed immediately adjacent said first end of said at least one aperture;
 said first circumferential slot defining a first angular extent about the rotational axis;
 said at least one aperture of said hub disc further comprising a second circumferential slot;
 said second circumferential slot being oriented generally in a circumferential direction about the rotational axis;

said second circumferential slot being disposed immediately adjacent said second end of said at least one aperture;

said second circumferential slot defining a second angular extent about the rotational axis;

said first control tab of said first control plate being at least partially disposed within said first circumferential slot;

said first control tab of said second control plate being at least partially disposed within said first circumferential slot;

said second control tab of said first control plate being at least partially disposed within said second circumferential slot;

said second control tab of said second control plate being at least partially disposed within said second circumferential slot;

said first circumferential slot configured for limiting travel of said idle suspension system in a first direction of rotation; and said second circumferential slot configured for limiting travel of said idle suspension system in a second direction of rotation.

5. The clutch disc according to claim 1, further comprising:

a first cover plate;

said first cover plate being disposed concentrically about the rotational axis;

a second cover plate;

said second cover plate being disposed concentrically about the rotational axis;

said hub disc being disposed between said first cover plate and said second cover plate;

said hub disc further comprising at least one slot;

said radially extending portion of said first control plate being disposed between said hub disc and said first cover plate;

a support plate;

said support plate being disposed concentrically about the rotational axis;

said support plate comprising a portion extending generally radially about the rotational axis;

said radially extending portion of said support plate being disposed between between said hub disc and said second cover plate;

said support plate comprising at least one arm;

said at least one arm projecting substantially in the axial direction from said radially extending portion of said support plate; said at least one arm of said support plate extending through said at least one slot of said hub disc;

an idle friction device;

said idle friction device being disposed between said radially extending portion of said first control plate and said radially extending portion of said support plate;

means for substantially isolating the axial loading of said idle friction device;

said means for substantially isolating said idle friction device comprising said support plate and said first control plate.

6. The clutch disc according to claim 5, wherein:

said first control plate and said support plate are non-rotationally connected; and said non-rotational connection comprises said at least one arm of said support plate.

7. The clutch disc according to claim 6, further comprising:

said at least one slot of said hub disc defining a first shoulder portion of said hub disc;

said at least one slot of said hub disc defining a second shoulder portion of said hub disc;

said first shoulder portion being separated from said second shoulder portion by a substantial circumferential distance;

said at least one arm of said support plate being disposed to operatively contact said first shoulder portion of said hub disc;

said at least one arm of said support plate being disposed to operatively contact said second shoulder portion of said hub disc;

said first shoulder portion comprising means for limiting travel of said idle suspension system in a first direction of rotation about the rotational axis; and said second shoulder portion comprising means for limiting travel of said idle suspension system in a second direction of rotation about the rotational axis.

8. The clutch disc according to claim 7, further comprising:

a load friction device;

a second control plate;

said second control plate being oriented concentrically about the rotational axis;

said second control plate being disposed between said radially extending portion of said support plate and said second cover plate; and said load friction device comprising said second control plate.

9. The clutch disc according to claim 1, further comprising:

a first cover plate;

said first cover plate being oriented concentrically about the rotational axis;

a second cover plate;

said second cover plate being oriented concentrically about the rotational axis;

said second cover plate comprising at least one opening;

a support plate;

said support plate being oriented concentrically about the rotational axis;

said support plate comprising a portion extending generally radially from the rotational axis;

said radially extending portion of said first control plate being disposed between said hub disc and said first cover plate;

said radially extending portion of said first control plate comprising a first side and a second side;

said first side of said first control plate being disposed adjacent said first cover plate;

said second side of said first control plate being disposed adjacent said hub disc;

said radially extending portion of said support plate being disposed to contact said second side of said first control plate;

said support plate comprising at least one arm;

said at least one arm of said support plate projecting substantially in the axial direction from said radially extending portion of said support plate;

said hub disc further comprising at least one slot;

said at least one arm of said support plate extending through said at least one slot of said hub disc;

said at least one slot of said hub disc comprising means for limiting travel of said idle suspension system;

said at least one arm of said support plate being at least partially disposed within said at least one opening in said second cover plate;

said opening of said second cover plate for non-rotationally connecting said support plate to said second cover plate;

means for axially supporting said at least one arm of said support plate against said second cover plate;

an idle friction device;

said idle friction device being disposed between said radially extending portion of said support plate and said second cover plate;

means for substantially isolating the axial loading of said idle friction device; and said means for substantially isolating said idle friction device comprising said first control plate and said second cover plate.

10. The clutch disc according to claim 1, further comprising:

a first cover plate;

said first cover plate being oriented concentrically about the rotational axis;

a second cover plate;

said second cover plate being oriented concentrically about the rotational axis;

said hub disc being disposed between said first cover plate and said second cover plate;

said radially extending portion of said first control plate being disposed between said hub disc and said first cover plate;

said radially extending portion of said first control plate comprising a first side and a second side;

said first side of said first control plate being disposed adjacent said first cover plate;

a support plate;

said support plate being oriented concentrically about the rotational axis;

said support plate comprising a portion extending generally radially about the rotational axis;

said radially extending portion of said support plate being disposed immediately adjacent said second side of said first control plate;

said support plate comprising at least one arm;

said at least one arm of said support plate projecting substantially in the axial direction from said radially extending portion of said support plate;

said at least one arm of said support plate comprising an end surface;

said end surface of said at least one arm being disposed at an opposite end of said at least one arm from said radially extending portion of said support plate;

said end surface of said at least one arm being disposed to contact said second cover plate;

said hub disc comprising at least one slot;

said at least one arm of said support plate extending through said at least one slot;

said at least one slot comprising means for limiting travel of said idle suspension system in a first direction about the rotational axis;

said at least one slot comprising means for limiting travel of said idle suspension system in a second direction about the rotational axis; an idle friction device;

said idle friction device being disposed between said radially extending portion of said support plate and said second cover plate;

means for substantially isolating the axial loading of said idle friction device; and said means for substantially isolating said idle friction device comprising said first cover plate, said support plate and said second cover plate.

11. The clutch disc according to claim 1, further comprising:

a first cover plate;

said first cover plate being oriented concentrically about the rotational axis;

a second cover plate;

said second cover plate being oriented concentrically about the rotational axis;

said hub disc being disposed between said first cover plate and said second cover plate;

said radially extending portion of said first control plate being disposed between said hub disc and said first cover plate;

a bearing element;

said bearing element comprising means for engaging said at least one control tab of said first control plate;

said engagement means comprising means for non-rotationally connecting said bearing element and said first control plate;

said bearing element being oriented concentrically about the rotational axis;

said bearing element being disposed between said hub disc and said second cover plate;

said at least one control tab extending through said at least one aperture of said hub disc;

said at least one control tab being disposed to engage said bearing element;

an idle friction device;

said idle friction device being disposed between said radially extending portion of said first cover plate and said bearing element;

means for substantially isolating the axial loading of said idle friction device; and said means for substantially isolating said idle friction device comprising said first control plate and said bearing element.

12. A clutch disc for a friction clutch, said clutch disc comprising:

a hub;

said hub being oriented concentrically about a rotational axis;

the rotational axis defining an axial direction;

the axial direction being generally parallel with the rotational axis;

said hub comprising means for being non-rotationally connected to a transmission shaft;

a hub disc;

said hub disc being oriented concentrically about the rotational axis;

said hub disc having a thickness;

said hub disc thickness being defined generally parallel with the rotational axis;

said hub disc being non-rotationally connected to said hub;

a first cover plate;

said first cover plate being oriented concentrically about the rotational axis;

a second cover plate;

said second cover plate being oriented concentrically about the rotational axis;

said hub disc being disposed between said first cover plate and said second cover plate;

said first cover plate being non-detachably connected to said second cover plate and being axially spaced-apart from said second cover plate;

friction lining means;

said friction lining means being non-rotatably connected to at least one of said first cover plate and said second cover plate;

a load suspension system;

said load suspension system being oriented generally concentrically about the rotational axis;

said load suspension system comprising:
   a plurality of load springs;
   a plurality of first apertures in said hub disc;
   a plurality of apertures in said first cover plate;
   a plurality of apertures in said second cover plate;
   each load spring of said plurality of load springs being located in a corresponding first aperture of said plurality of first apertures in said hub disc;
   each load spring of said plurality of load springs being located in a corresponding aperture of said first cover plate; and
   each load spring of said plurality of load springs being located in a corresponding aperture of said second cover plate;

a control plate;

said control plate being oriented concentrically about the rotational axis;

said control plate being disposed between said first cover plate and said second cover plate;

said control plate comprising stop means for limiting rotational play of said first control plate with respect to said hub disc;

said control plate comprising means for being actively connected to at least one of said plurality of load springs;

an idle suspension system;

said idle suspension system being oriented generally concentrically about the rotational axis;

said idle suspension system being disposed generally radially inside said load suspension system;

said idle suspension system comprising said control plate;

said idle suspension system further comprising:
   a plurality of idle springs;
   each of said plurality of idle springs having a width;
   said width of each of said plurality of idle springs being similar to said thickness of said hub disc;
   a plurality of second apertures in said hub disc;
   each of said plurality of idle springs being disposed at least partially within a corresponding second aperture of said plurality of second apertures of said hub disc;
   said control plate being disposed to actuate said plurality of idle springs; and said stop means for limiting travel of said idle suspension system about the rotational axis;

said control plate comprising a portion extending generally radially about the rotational axis;

said control plate comprising a plurality of control tabs;

each of said plurality of control tabs projecting substantially in the axial direction from said radially extending portion of said control plate; and each of said plurality of control tabs being disposed to operatively contact a corresponding idle spring of said plurality of idle springs to activate said idle suspension system.

13. The clutch disc of claim 12, further comprising:

each of said plurality of control tabs of said first control plate comprising an end surface;

said end surface of each of said plurality of control tabs of said first control plate being disposed at a corresponding opposite end of each of said plurality of control tabs from said radially extending portion of said first control plate;

said control plate is a first control plate;

said clutch disc further comprising a second control plate;

said second control plate being oriented concentrically about the rotational axis;

said second control plate comprising a portion extending generally radially about the rotational axis;

said second control plate comprising a plurality of control tabs;

each of said plurality of control tabs of said second control plate projecting substantially in the axial direction from said radially extending portion of said second control plate;

each of said plurality of control tabs of said second control plate comprising an end surface;

said end surface of each of said plurality of control tabs of said second control plate being disposed at a corresponding opposite end of each of said plurality of control tabs from said radially extending portion of said second control plate;

each of said plurality of end surfaces of said first control plate being disposed to contact a corresponding end surface of said plurality of end surfaces of said second control plate;

an idle friction device;

said idle friction device being disposed between said radially extending portion of said first control plate and said radially extending portion of said second control plate;

means for substantially isolating the axial loading of said idle friction device; and said means for substantially isolating said idle friction device comprising said first control plate and said second control plate.

14. The clutch disc according to claim 13, further comprising:

said radially extending portion of said first control plate being disposed between said first cover plate and said hub disc;

said radially extending portion of said second control plate being disposed between said second cover plate and said hub disc;

a load friction device;

said load friction device being disposed between at least one of the following a) and b):

a) said first cover plate and said first control plate; and
b) said second cover plate and said second control plate;

said plurality of control tabs of said first control plate comprising a first control tab and a second control tab;

said plurality of control tabs of said second control plate comprising a first control tab and a second control tab;

said end surface of said first control tab of said first control plate being disposed to contact said end surface of said first control tab of said second control plate;

said end surface of said second control tab of said first control plate being disposed to contact said end surface of said second control tab of said second control plate;

at least one of said plurality of second apertures of said hub disc further comprising a first end and a second end;

said first end of said at least one second aperture of said hub disc being disposed circumferentially opposite said second end of said at least one second aperture;

said at least one second aperture of said hub disc further comprising a first circumferential slot;

said first circumferential slot being oriented generally in a circumferential direction about the rotational axis;

said first circumferential slot being immediately adjacent said first end of said at least one second aperture;

said first circumferential slot defining a first angular extent about the rotational axis;

said at least one second aperture of said hub disc further19 comprising a second circumferential slot;

said second circumferential slot being oriented generally in a circumferential direction about the rotational axis;

said second circumferential slot being immediately adjacent said second end of said at least one aperture;

said second circumferential slot defining a second angular extent about the rotational axis;

said first control tab of said first control plate being at least partially disposed within said first circumferential slot;

said first control tab of said second control plate being at least partially disposed within said first circumferential slot;

said second control tab of said first control plate being at least partially disposed within said second circumferential slot;

said second control tab of said second control plate being at least partially disposed within said second circumferential slot;

said first circumferential slot for limiting travel of said idle suspension system in a first direction of rotation; and said second circumferential slot for limiting travel of said idle suspension system in a second direction of rotation.

15. The clutch disc according to claim 12, further comprising:
   said radially extending portion of said control plate being disposed between said hub disc and said first cover plate;
   a support plate;
   said support plate being disposed concentrically about the rotational axis;
   said support plate comprising a portion extending generally radially about the rotational axis;
   said radially extending portion of said support plate being disposed between between said hub disc and said second cover plate;
   said support plate comprising at least one arm; said at least one arm projecting substantially in the axial direction from said radially extending portion of said support plate;
   said at least one arm of said support plate extending through a corresponding first aperture of said plurality of first apertures of said hub disc;
   an idle friction device;
   said idle friction device being disposed between said radially extending portion of said control plate and said radially extending portion of said support plate;
   means for substantially isolating the axial loading of said idle friction device;
   said means for substantially isolating said idle friction device comprising said support plate and said control plate;
   said control plate and said support plate are non-rotationally connected; and
   said non-rotational connection comprising said at least one arm of said support plate.

16. The clutch disc according to claim 12, further comprising:
   said second cover plate further comprising at least one opening;
   a support plate;
   said support plate being oriented concentrically about the rotational axis;
   said support plate comprising a portion extending generally radially from the rotational axis;
   said radially extending portion of said control plate being disposed between said hub disc and said first cover plate;
   said radially extending portion of said control plate comprising a first side and a second side;
   said first side of said control plate being disposed adjacent said first cover plate;
   said second side of said control plate being disposed adjacent said hub disc;
   said radially extending portion of said support plate being disposed to contact said second side of said control plate;
   said support plate comprising at least one arm;
   said at least one arm of said support plate projecting substantially in the axial direction from said radially extending portion of said support plate;
   said at least one arm of said support plate extending through a corresponding first aperture of said plurality of first apertures of said hub disc;
   at least one of said plurality of first apertures of said hub disc comprising means for limiting travel of said idle suspension system about the rotational axis;
   said at least one arm of said support plate being partially disposed within a corresponding opening of said at least one opening of said second cover plate;
   said at least one opening of said second cover plate for non-rotationally connecting said support plate to said second cover plate;
   an idle friction device;
   said idle friction device being disposed between said radially extending portion of said support plate and said second cover plate;
   means for substantially isolating the axial loading of said idle friction device; and said means for substantially isolating said idle friction device comprising said control plate and said second cover plate.

17. The clutch disc according to claim 12, further comprising:

said radially extending portion of said control plate being disposed between said hub disc and said first cover plate;

said radially extending portion of said control plate comprising a first side and a second side;

said first side of said control plate being disposed adjacent said first cover plate;

a support plate;

said support plate being oriented concentrically about the rotational axis;

said support plate comprising a portion extending generally radially about the rotational axis;

said radially extending portion of said support plate being disposed immediately adjacent said second side of said control plate;

said support plate comprising at least one arm;

said at least one arm of said support plate projecting substantially in the axial direction from said radially extending portion of said support plate;

said at least one arm of said support plate comprising an end surface;

said end surface of said at least one arm being disposed at an opposite end of said at least one arm from said radially extending portion of said support plate;

said end surface of said at least one arm being disposed to contact said second cover plate;

said at least one arm of said support plate extending through a corresponding first aperture of said plurality of first apertures of said hub disc;

at least one of said plurality of first apertures of said hub disc comprising means for limiting travel of said idle suspension system in a first direction about the rotational axis;

at least one of said plurality of first apertures of said hub disc comprising means for limiting travel of said idle suspension system in a second direction about the rotational axis;

an idle friction device;

said idle friction device being disposed between said radially extending portion of said support plate and said second cover plate;

means for substantially isolating the axial loading of said idle friction device; and said means for substantially isolating said idle friction device comprising said first control plate, said support plate and said second cover plate.

18. The clutch disc according to claim 12, further comprising:

said radially extending portion of said first control plate being disposed between said hub disc and said first cover plate;

a bearing element;

said bearing element comprising means for engaging said plurality of control tabs of said first control plate;

said engagement means comprising means for non-rotationally connecting said bearing element and said first control plate;

said bearing element being oriented concentrically about the rotational axis;

said bearing element being disposed between said hub disc and said second cover plate;

each of said plurality of control tabs of said first control plate extending through a corresponding second aperture of said plurality of second apertures of said hub disc;

said plurality of control tabs of said first control plate being disposed to engage said bearing element;

an idle friction device;

said idle friction device being disposed between said radially extending portion of said first cover plate and said bearing element;

means for substantially isolating the axial loading of said idle friction device; and said means for substantially isolating said idle friction device comprising said first control plate and said bearing element.

* * * * *

UNITED STATES PATENT AND TRADEMARK OFFICE
CERTIFICATE OF CORRECTION

PATENT NO. : 5,769,199
DATED : June 23, 1998
INVENTOR(S) : Norbert LOHAUS

It is certified that error appears in the above-identified patent and that said Letters Patent is hereby corrected as shown below:

On the title page, item [56], following 'References Cited', add the following:

```
        --U.S. PATENT DOCUMENTS
   4,655,337    4-87      Carmillet et al.
   4,936,433    6-90      Kyle
   4,993,530    2-91      Maki
   5,529,161    6-96      Ament et al.
   5,542,516    8-96      Wack--.
```

On the title page, item [56], under the FOREIGN PATENT DOCUMENTS section, add the following:

--0475283    3/1992         Europe--.

UNITED STATES PATENT AND TRADEMARK OFFICE
CERTIFICATE OF CORRECTION

PATENT NO. : 5,769,199
DATED : June 23, 1998
INVENTOR(S) : Norbert LOHAUS

It is certified that error appears in the above-identified patent and that said Letters Patent is hereby corrected as shown below:

In column 15, line 46, Claim 5, after the first occurrence of 'between' delete "between".

In column 21, line 28, Claim 14, after 'disc', delete "further19" and insert --further--.

Signed and Sealed this

Twenty-eighth Day of September, 1999

Attest:

Q. TODD DICKINSON

Attesting Officer     Acting Commissioner of Patents and Trademarks